United States Patent [19]
Bair

[11] 3,731,054
[45] May 1, 1973

[54] HEAT SEALER

[75] Inventor: Lester E. Bair, Brownsville, Tex.

[73] Assignee: Fairshare Marketing & Manufacturing Co., Inc., Brownsville, Tex.

[22] Filed: May 19, 1972

[21] Appl. No.: 255,192

[52] U.S. Cl.................219/243, 93/DIG. 1, 156/515
[51] Int. Cl..............................................H05b 1/00
[58] Field of Search....................219/243; 93/DIG. 1; 53/373; 156/515, 583

[56] References Cited

UNITED STATES PATENTS

| | | | |
|---|---|---|---|
| 3,106,630 | 10/1963 | Klamp | 219/243 X |
| 3,375,777 | 4/1968 | Techtmann et al. | 219/243 |
| 3,624,349 | 11/1971 | Mayer | 219/243 |
| 3,597,587 | 8/1971 | Baum | 219/243 |

Primary Examiner—C. L. Albritton
Attorney—Claude A. Fishburn et al.

[57] ABSTRACT

A packaging device for closing containers formed of heat sealable flexible plastic is mounted in a housing having a base portion with a compartment therein which is closed by a cover member having an elongated opening therein and a lid is hingedly mounted on the housing and movable between a position overlying the cover member and a position spaced from the cover member. A material engaging member is positioned within the compartment and is selectively movable between a position having an edge of a first portion aligned with the opening in the cover member and a position having a surface of a second portion aligned with the opening in the cover member and a press member mounted on the lid and movable to a position in overlying relation with the material engaging member to effect engagement of material to be heat sealed with the material engaging member which is heated to a selected temperature. The edge of the first portion of the material engaging member is effective to heat seal the container and cut the plastic adjacent the heat sealed portion.

11 Claims, 9 Drawing Figures

Patented May 1, 1973
3,731,054

Patented May 1, 1973
3,731,054
3 Sheets-Sheet 2
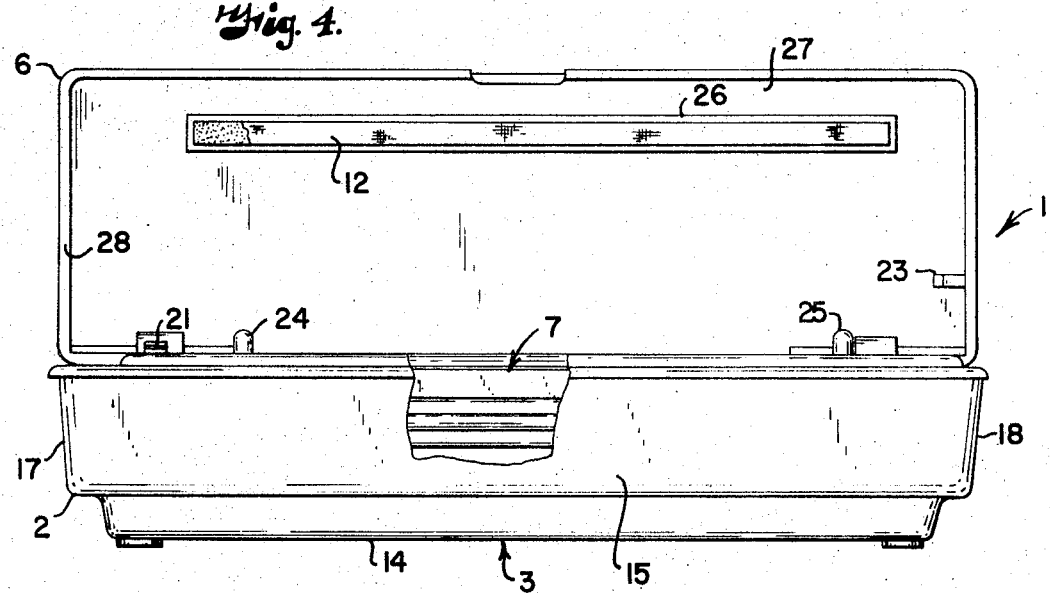
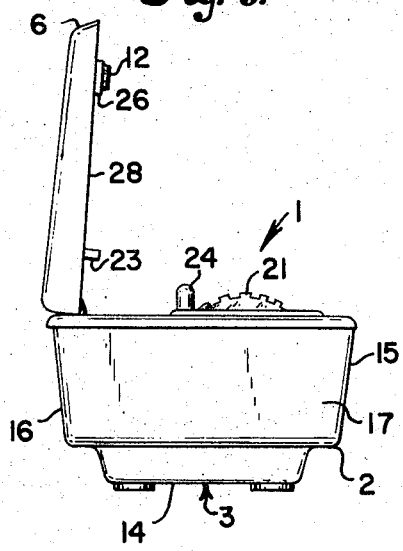
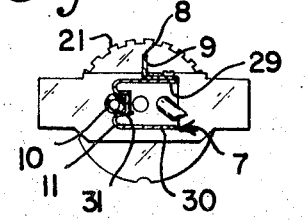
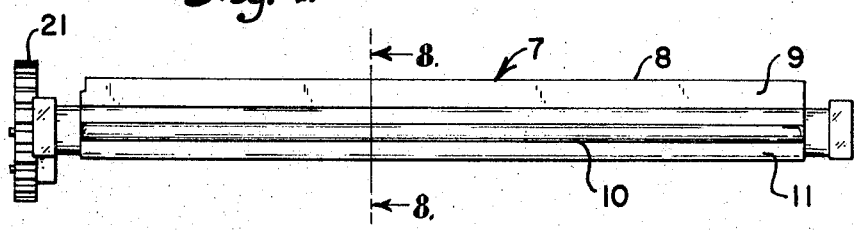

Patented May 1, 1973

HEAT SEALER

The present invention relates to packaging devices and more particularly to a packaging device for closing containers formed of heat sealable plastic and having a material engaging member selectively movable to position an edge of a first portion thereof to be engaged by material to be heat sealed and to position a surface of a second portion to be engaged by material to be heat sealed.

The principal objects of the present invention are: to provide a packaging device adapted for closing containers formed of heat sealable flexible plastic; to provide such a packaging device adapted to heat seal such flexible plastic containers at temperatures in the range of 200° F. to 280° F.; to provide such a packaging device adapted to seal boilable bags containing vegetables, meat, leftovers, and the like at temperatures of 280° F. to 375° F.; to provide such a packaging device adapted to heat seal boilable bags formed of a mylar and polyethylene sheets laminated together to thereby form a substantially moisture-proof sealed container which is also dust proof and air tight; to provide such a packaging device wherein a surface on one portion of a material engaging member has a release material engageable with material to be heat sealed thereby substantially eliminating adherence of the material to the surface; to provide such a packaging device wherein the surface of the material engaging member is formed of a substance having Underwriters Laboratory approval for use at high temperatures, such as up to 375° F.; to provide such a packaging device wherein another portion of the material engaging member has an edge engageable with the material to be heat sealed thereby effecting sealing and then cutting of the material; to provide such a packaging device having means thereon adapted to hold a portion of a container within the packaging device thereby leaving both hands free for operating the device; to provide such a packaging device having a short warm-up time even for high temperatures such as up to 375° F.; and to provide such a packaging device which is economical to manufacture, durable in use, versatile in mounting, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment of the present invention and illustrate various objects and features of the container closing device.

FIG. 4 is a front elevational view of the container closing device with portions broken away to show a material engaging member.

FIG. 5 is an end elevational view of the container closing device showing the lid in an open position.

FIG. 7 is a fragmentary side elevational view of the material engaging member.

FIG. 7 is a fragmentary side elevational view of the material engaging member.

FIG. 8 is a transverse sectional view through the material engaging member and taken on line 8—8, FIG. 7.

Figure 1:
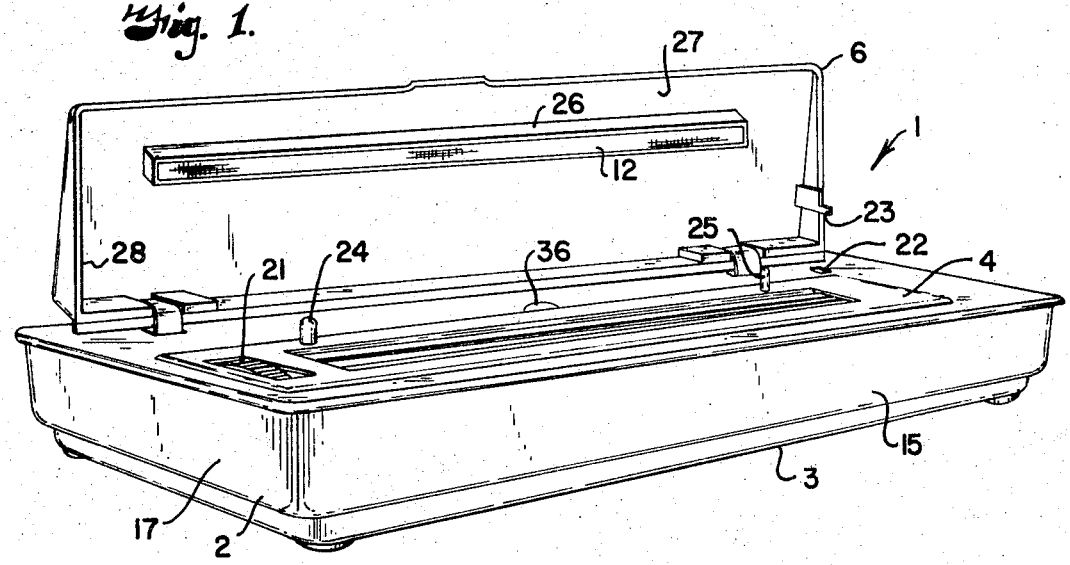
FIG. 1 is a perspective view of a container closing device embodying features of the present invention and shown with a lid thereon in an open position.
Figure 2:
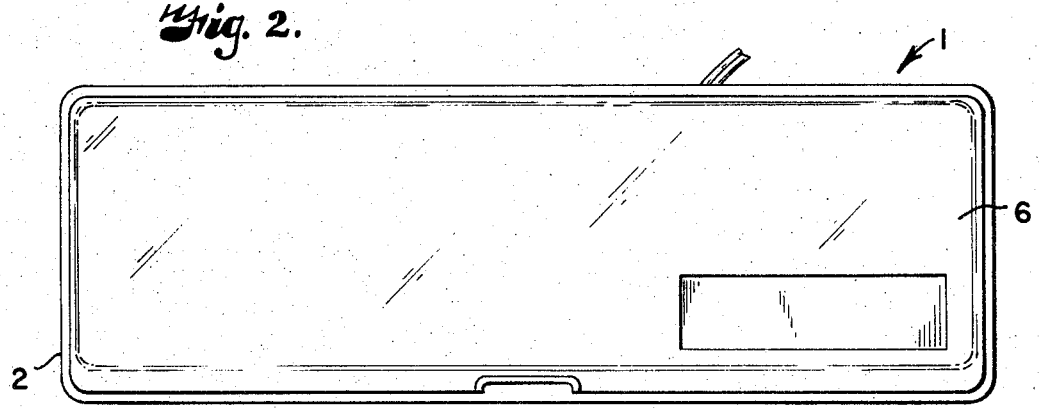
FIG. 2 is a top plan view of the container closing device showing the lid in a closed position.
Figure 3:
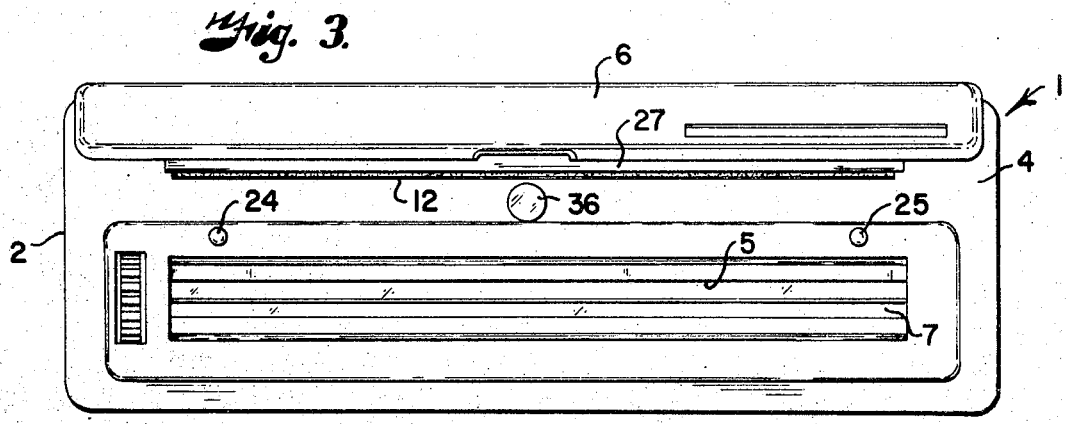
FIG. 3 is a top plan view of the container closing device showing the lid in an open position.
Figure 6:
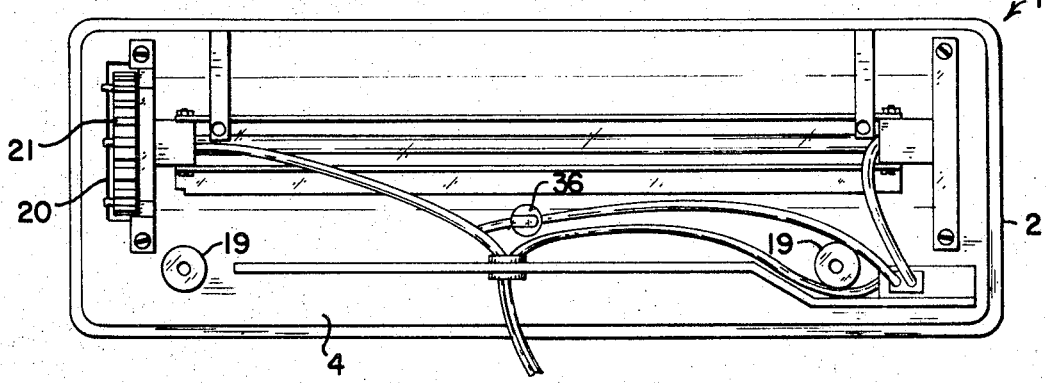
FIG. 6 is a bottom plan view of a cover member with the material engaging member mounted thereon.
Figure 9:
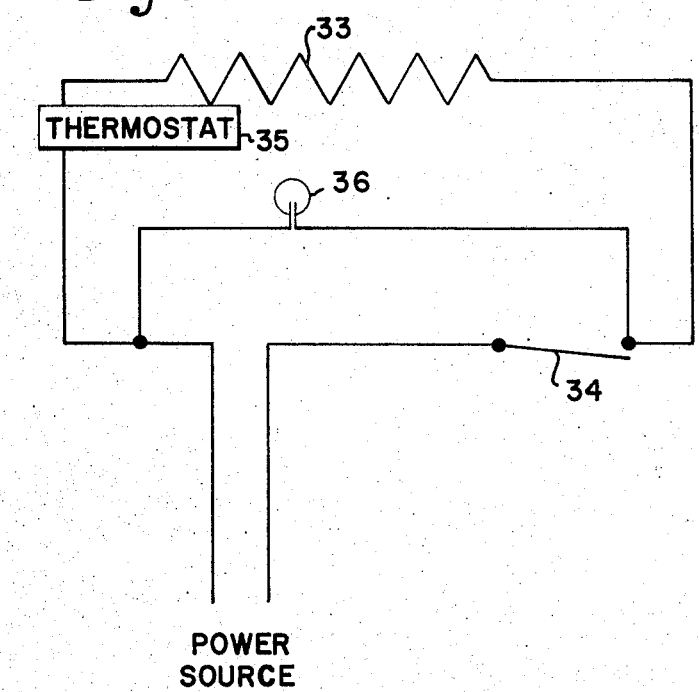
FIG. 9 is a wiring diagram for the heat sealing device with essential operating parts diagrammatically shown.

Referring more in detail to the drawings:

As required detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates a heat sealing and package closing device for heat sealing flexible plastic containers (not shown) and particularly containers having items therein such as food, for example bread, potato chips, lunchmeat, vegetables, leftovers, and the like. The package closing and heat sealing device 1 is mounted in a housing 2 having a base portion 3 with a compartment therein which is closed by a cover member 4 having an elongated slot or opening 5 therein and a lid 6 is hingedly mounted on the housing 2 and movable between a position overlying the cover member 4 and a position spaced from the cover member 4. A material engaging member 7 is positioned within the compartment and is selectively movable between a position having an edge 8 of a first portion 9 aligned with the opening 5 in the cover member 4 and a position having a surface 10 of a second portion 11 aligned with the opening 5 in the cover member 4 and a press member 12 is mounted on the lid 6 and is movable to a position in overlying relation with the material engaging member 7 to effect engagement of the material (not shown) to be heat sealed with the material engaging member 7, which is suitably heated to a selected temperature. The edge of the first portion 9 of the material engaging member 7 is effective to heat seal the respective container and cut the plastic adjacent the heat sealed portion.

In the illustrated structure, the base portion 3 of the housing 2 is defined by a bottom wall 14 and spaced front and rear side walls 15 and 16 respectively extending upwardly from the bottom wall 14 and opposed end walls 17 and 18 extending upwardly from the bottom wall 14 and extending between respective opposite ends of the front and rear walls 15 and 16. The base portion 3 has an open top which is closed by the cover member 4 thereby defining a compartment within the base portion 3 for enclosing the material engaging member 7.

Suitable means are provided to secure the cover member 4 on the base portion 3, such as suitable fastening members extending through the bottom wall 14 and into suitable spaced sleeve members 19 depending from the cover member 4. The elongated slot or opening 5 in the cover member 4 is illustrated as being positioned substantially parallel with one of the side walls, for example the front wall 15. A slot 20 is also formed in the cover member 4 and is positioned adjacent one end of the elongated slot or opening 5 to permit a knob 21 of the material engaging member 7 to extend therethrough. The cover member 4 also has an opening or aperture 22 therein to permit a projection 23 extending from the cover member 4 to extend therethrough, for a purpose later described.

It is desirable to provide means on the package closing and sealing device 1 for engaging portions of a container in overlying relation with the material engaging member 7, such containers are generally formed of polyethylene film sheets or portions which are to be heat sealed together. The illustrated structure includes at least one pair of upstanding posts 24 and 25 adapted to have suitable apertures in portions of the container (not shown) moved over the post with the container having a portion overlying the slot or opening 5 in the cover member 4 and extending from the heat sealing device 1.

The lid 6 may be mounted on the housing 2 in a manner permitting movement of the press member 12 into a position aligned with and overlying the material engaging member 7 to thereby move material to be heat sealed into engagement with the respective selected portion of the material engaging member 7. In the illustrated structure, the lid 6 has one edge thereof suitably hingedly connected to the base portion 3 adjacent the rear side wall 16 thereof.

An elongated rib 26 extends from an interior surface 27 of the lid 6 and has the press member 12 mounted thereon. The rib 26 and the press member 12 thereon are aligned with the elongated slot or opening 5 in the cover member 4 when the lid 6 is in a position overlying the cover member 4. Peripheral edges 28 of the lid 6 are spaced from the cover member 4 when the lid 6 is in position overlying the cover member 4 to thereby maintain the peripheral edges 28 of the lid 6 out of engagement with the respective container or article to be heat sealed.

The material engaging member 7 has a body portion having at least two elongated portions positioned in angular relation and defining the first portion 9 and the second portion 11. In the illustrated structure, the body portion is a generally U-shaped member having a pair of spaced flanges 29 and 30 extending from a web portion 31 having the second portion 11 of the material engaging member 7 thereon. The first portion 9 of the material engaging member 7 is illustrated as a flange 32 extending from one of the flanges of the body portion, for example flange 29, and the flange 32 is generally normal or perpendicular to the flange 29. The flange 32 has an outer or free edge adapted to be engaged by material to be heat sealed.

It is desirable that the surface 10 of the second portion 11 be formed of a suitable release material to thereby substantially eliminate adherence between material to be heat sealed and the surface 10 of the second portion 11 of the material engaging member 7. A silicone rubber coating particularly when applied to a fiberglass material has been found to provide the desired release characteristics and to remain substantially inert and stable when heated up to temperatures of 375° F. In the illustrated structure, the second portion 11 is illustrated as a tubular member having a heating element 33 extending therethrough.

It is desirable that the press member 12 have a surface formed of a release material which will resist temperatures in excess of 375° F. to thereby substantially eliminate adherence between the press member 12 and the material to be heat sealed and to remain substantially inert and stable while engaged with material to be heat sealed. A glass fabric having a teflon coating has been found to provide the desired release characteristics and to remain substantially stable and inert at high temperatures.

The heat sealing device 1 includes suitable electrical means connecting a source of electrical power and the material engaging member 7 and in the illustrated structure, the heating element 33 is operative to heat the material engaging member to a temperature within a selected range of temperatures in response to moving the lid 6 to a position spaced from the cover member 4 thereby moving the projection 23 out of engagement with a normally closed switch 34 or a switch having means to normally resiliently urge a switch arm to a position completing an electrical circuit. When the projection 23 is out of engagement with the switch 34, the electrical circuit is thereby completed whereby the heating element 33 is effective to heat the material engaging member 7.

It is desirable to maintain the heating element 33 and thereby the material engaging member 7 at a selected temperature or within a selected temperature range as determined by the material to be heat sealed. Therefore, a suitable thermostat 35 is positioned in the circuit completed by movement of the switch 34 and the thermostat 35 is positioned adjacent one end of the heating element 33 and in engagement with the heating element 33 to thereby react directly to the temperature thereof.

It is desirable to provide means to indicate that the heating element 33 is operating, therefore, a suitable indicator lamp 36 is electrically connected in the circuit completed by closing the switch 34 and in the illustrated embodiment, the indicator lamp 36 is mounted in parallel between opposite ends of the heating element 33 and more particularly between another end of the heating element 33 and the thermostat 35 at the one of the heating element 33.

In using a heat sealing and package closing device constructed as illustrated and described, material to be heat sealed, such as polyethylene containers for use with food, has an edge portion thereof positioned in overlying relation with the elongated slot or opening 5 in the cover member 4 and with the material engaging member 7 aligned therewith. Conventional plastic containers are generally formed of polyethylene and may be sealed with a temperature in the range of 200° F. to 280° F. depending upon the thickness of the sheets of polyethylene. The knob 21 is turned to position the edge of the flange 32 defining the first portion 9 of the material engaging member 7 in alignment with the elongated slot or opening 5 and cover member 4. Opening the lid 6 and thereby moving the projection 23 out of engagement with the switch 34 activates or energizes the heating element 33 and movement of the lid 6 and the press member 12 thereon to a position overlying the cover member 4 is effective to move the press member 12 into engagement with the material to be heat sealed and the press member 12 moves the material to be heat sealed into engagement with the material engaging member 7 thereby holding same in clamping engagement therebetween. The edge of the flange 32 then both heat seals and cuts the material to be heat sealed so that when the lid 6 is moved to an open position the container formed of material to be heat sealed may be moved from the heat sealing device 1 with one edge thereof heat sealed and the portion remaining on the cover member 4 may be discarded.

The heat sealing device 1 is particularly adapted for use in heat sealing materials requiring substantially higher temperatures than conventional polyethylene containers, such as boilable food containers formed of laminated polyethylene and mylar sheets with the polyethylene sheets being in facing relation. It is preferred that such boilable containers have apertures adjacent one edge thereof whereby the boilable container may be hooked onto the posts 24 and 25 and thereby held in position permitting both hands to be free for operation of the heat sealing device 1. The knob 21 is adjusted to position the surface 10 of the second portion 11 in alignment with the elongated slot or opening 5 in the cover member 4. The lid 6 is moved to a position having the press member 12 engaging the boilable container thereby urging same into engagement with the material engaging member 7. After the lid 6 is moved to an open position, the boilable container may be removed from the heat sealing device.

It is to be understood that while I have illustrated and described one form of my invention, it is not to be limited to the specific form or arrangement of parts herein described and shown.

What I claim and desire to secure by Letters Patent is:

1. A container closing device comprising:
   a. a housing having a base portion having a elongated opening portion therein;
   b. a lid hingedly mounted on said housing and movable between a position overlying the base portion and a position spaced therefrom;
   c. an elongated material engaging member within the opening portion and having at least one part of a plurality of parts selectively exposed and engageable by material to be heat sealed;
   d. an elongated press member mounted on said lid and positioned thereon to be in aligned overlying relation with said material engaging member and operative to move material to be heat sealed into engagement with said material engaging member when said lid is in overlying relation with said base member; and
   e. electrical means connecting a source of electrical power and said material engaging member and operative to heat said material engaging member to a temperature within a selected range of temperatures in response to moving said lid to a position spaced from said base member whereby movement of said press member into engagement with the material to be heat sealed and engagement of the material with said material engaging member effects heat sealing of the material.

2. A container closing device as set forth in claim 1 wherein:
   a. said material engaging member has a first portion having an edge engageable by material to be heat sealed;
   b. said material engaging member has a second portion having a surface engageable by material to be heat sealed;
   c. the surface of the second portion of said material engaging member is formed of a release material to thereby substantially eliminate adherence between the material to be heat sealed and the surface of said second portion of said material engaging member; and
   d. said material engaging member is mounted in said base member in a manner to permit movement thereof between a position having the first portion aligned with the opening in said cover member and a position having the second portion aligned with the opening in said cover member.

3. A container closing device as set forth in claim 1 wherein:
   a. said electrical means includes a heating element and a normally closed switch and means to control the temperature of the heating element;
   b. said lid has a projecting member extending therefrom and engageable with said switch to open same when said lid is in position overlying said cover member;
   c. said material engaging member has the heating element in engagement therewith;
   d. said material engaging member has a first portion having an edge engageable by material to be heat sealed and a second portion spaced from the first portion and engageable by material to be heat sealed; and
   e. said material engaging member is mounted in said base member in a manner to permit movement thereof between a position having the first portion aligned with the opening in said base member and a position having the second portion aligned with the opening in said base member.

4. A container closing device as set forth in claim 1 wherein:
   a. said base portion of said housing has wall portions defining a compartment therein;
   b. a cover member is mounted on said housing and closing the compartment;
   c. said cover member has the elongated opening portion therein; and
   d. said material engaging member is positioned within the compartment and has the one part thereof aligned with the opening in said cover member.

5. A container device as set forth in claim 1 wherein:
   a. said material engaging member has a plurality of sides and a longitudinal axis and a flange extending generally radially from one side and having an edge adapted to be engaged by material to be heat sealed and a surface on another side and adapted to be engaged by material to be heat sealed;
   b. said cover member has means thereon for mounting a portion of said material to be heat sealed in overlying relation with the opening in said cover member; and
   c. said cover member has means thereon for mounting said material engaging member in a manner to permit selective movement of said material engaging member between a position having the edge of the flange in alignment with the opening in said cover member and a position having the surface on the other side of said material engaging member in alignment with the opening in said cover member.

6. A container closing device comprising:
a. an elongated housing having a base portion with a compartment therein and a cover member closing the compartment, said cover member having an elongated opening therein;
b. a lid having one edge hingedly mounted on said housing and movable between a position overlying said cover member and a position substantially normal to said cover member;
c. an elongated material engaging member mounted on said cover member and positioned within the compartment and having a first portion having an edge engageable by material to be heat sealed and a second portion having a surface engageable by material to be heat sealed, said material engaging member being mounted for movement between a position having the edge in alignment with the opening in said cover member and a position having the surface in alignment with the opening in said cover member;
d. an elongated press member mounted on said lid and positioned thereon to be in overlying relation with said material engaging member when said lid is in overlying relation with said cover member;
e. means on said cover member for positioning a portion of said material to be heat sealed in overlying relation with the opening in said cover member; and
f. a heating element electrically connected to a source of electrical power and positioned in engagement with said material engaging member and adapted to heat said material engaging member to a temperature within a selected range of temperatures.

7. A heat sealing device as set forth in claim 6 wherein:
a. said material engaging member has a generally U-shaped portion having a pair of spaced flanges extending from a web portion;
b. said surface of the second portion of said material engaging member is positioned on the web portion of said U-shaped portion;
c. said first portion of said material engaging member comprises a flange extending from one of said flanges of said U-shaped portion and generally normal thereto.

8. A heat sealing device as set forth in claim 6 wherein:
a. said surface of the second portion of said material engaging member is formed of a release material to thereby substantially eliminate adherence between the material to be heat sealed and said surface of said second portion of said material engaging member; and
b. said press member has a surface formed of a release material to thereby substantially eliminate adherence between said press member and the material to be heat sealed.

9. A heat sealing device, as set forth in claim 8 wherein:
a. said release material forming said surface of the second portion is a silicone rubber; and
b. said release material forming the surface of said press member is a glass fabric having a teflon coating.

10. A heat sealing device as set forth in claim 6 wherein:
a. said material engaging member has a body portion having at least two elongated portions positioned in angular relation;
b. said surface of the second portion of said material engaging member is positioned on one of the elongated portions;
c. said surface of the second portion of said material engaging member is formed of a release material to thereby substantially eliminate adherence between the material to be heat sealed and said surface of said second portion of said material engaging member; and
d. said first portion of said material engaging member comprises a flange extending from another of the elongated portions and generally normal thereto.

11. A heat sealing device as set forth in claim 10 wherein:
a. said press member is formed of a resilient material having a surface formed of a release material to thereby substantially eliminate adherence between said press member and material to be heat sealed;
b. said release material forming the surface of said press member is a glass fabric having a teflon coating; and
c. said release material forming said surface of the second portion of said material engaging member is fiberglass coated with silicone rubber.

* * * * *

Dedication 3,731,054.—*Lester E. Bair*, Brownsville, Tex. HEAT SEALER. Patent dated May 1, 1973. Dedication filed Dec. 5, 1977, by the assignee, *Promotional Merchants, Inc.*

Hereby dedicates to the Public the entire remaining term of said patent.

[*Official Gazette May 2, 1978.*]